US010789960B2

(12) United States Patent
Libert et al.

(10) Patent No.: US 10,789,960 B2
(45) Date of Patent: Sep. 29, 2020

(54) METHOD AND SYSTEM FOR USER AUTHENTICATION BY VOICE BIOMETRICS

(71) Applicant: PW GROUP, Paris (FR)

(72) Inventors: Gregory Libert, Paris (FR); Dijana Petrovski Chollet, Boulogne-Billancourt (FR); Houssemeddine Khemiri, Ris Orangis (FR)

(73) Assignee: PW GROUP, Paris (FR)

( * ) Notice: Subject to any disclaimer, the term of this patent is extended or adjusted under 35 U.S.C. 154(b) by 0 days.

(21) Appl. No.: 15/803,024

(22) Filed: Nov. 3, 2017

(65) Prior Publication Data
US 2018/0130476 A1    May 10, 2018

(30) Foreign Application Priority Data

Nov. 7, 2016    (FR) ...................... 16 60734

(51) Int. Cl.
*G10L 17/24*        (2013.01)
*G10L 17/16*        (2013.01)
*G10L 17/20*        (2013.01)

(52) U.S. Cl.
CPC .............. *G10L 17/24* (2013.01); *G10L 17/16* (2013.01); *G10L 17/20* (2013.01)

(58) Field of Classification Search
CPC .... G10L 15/08; G10L 15/26; G10L 2015/088
See application file for complete search history.

(56) References Cited

U.S. PATENT DOCUMENTS 5,293,452 A    3/1994  Picone et al.
6,272,463 B1 *  8/2001  Lapere .................. G10L 15/065
                                              704/243

(Continued)

FOREIGN PATENT DOCUMENTS

EP      2 784 710 A2    10/2014
WO    2006/027844 A1     3/2006

OTHER PUBLICATIONS

Qi Li et al: "Recent advancements in automatic speaker authentication", IEEE Robotics & Automation Magazine, vol. 6, No. 1. Mar. 1, 1999 (Mar. 1, 1999), pp. 24-34. XP055390647, US ISSN: 1070-9932, DOI: 10.1109/100.755812 p. 26-p. 31; figures 1-8.

(Continued)

*Primary Examiner* — Richemond Dorvil
*Assistant Examiner* — Mark Villena
(74) *Attorney, Agent, or Firm* — Nixon & Vanderhye

(57)    ABSTRACT

Disclosed is a method including a prior phase for referencing an authorized user, during which this user pronounces a reference phrase at least once, the phrase being converted into a series of reference symbols by a statistical conversion mutual to all of the users to be referenced, and an authentication test phase, including a first step during which a candidate user pronounces the reference phrase at least once, and this pronounced phrase is converted in the same manner as the reference phrase during the prior phase, by using the same conversion, into a sequence of candidate symbols, and a second step during which the series of candidate symbols is compared to the series of reference symbols to determine a comparison result, which is compared to at least one predetermined threshold, determining whether the candidate user who pronounced the phrase during the test phase is indeed the authorized user, providing authentication.

5 Claims, 2 Drawing Sheets

(56) References Cited

U.S. PATENT DOCUMENTS

| | | | |
|---|---|---|---|
| 7,386,448 B1 | 6/2008 | Poss et al. | |
| 2003/0200087 A1* | 10/2003 | Aronowitz | G10L 17/08 704/241 |
| 2007/0198257 A1* | 8/2007 | Zhang | G10L 17/08 704/233 |
| 2007/0294083 A1* | 12/2007 | Bellegarda | G10L 17/04 704/250 |
| 2010/0179813 A1* | 7/2010 | Summerfield | G10L 17/14 704/246 |
| 2013/0262873 A1* | 10/2013 | Read | H04W 12/06 713/186 |
| 2013/0325473 A1* | 12/2013 | Larcher | G10L 17/10 704/249 |
| 2015/0088509 A1* | 3/2015 | Gimenez | G10L 17/22 704/243 |
| 2015/0278805 A1* | 10/2015 | Spencer, III | G06F 21/36 705/44 |
| 2015/0302848 A1* | 10/2015 | Kurata | G10L 15/187 704/254 |
| 2015/0371639 A1 | 12/2015 | Foerster et al. | |
| 2016/0225374 A1* | 8/2016 | Rodriguez | G10L 17/04 |

OTHER PUBLICATIONS

Manas A Pathak et al: 11 Privacy-preserving speaker verification as password matching, 2012 IEEE International Conference on Acoustics. Speech and Signal Processing (ICASSP 2012) : Kyoto, Japan, Mar. 25-30, 2012 ; [Proceedings]. IEEE. Piscataway. NJ. Mar. 25, 2012 (Mar. 25, 2012). pp. 1849-1852, XP032227502, DOI: 10.1109/ICASSP.2012.6288262 ISBN : 978-1-4673-0045-2.

O'Gorman L: "Comparing passwords, tokens, and biometrics for user authentication", Proceedings of the IEEE, IEEE. New York, US, vol. 91, No. 12, Dec. 1, 2003 (Dec. 1, 2003), pp. 2021-2040, XP011103638, ISSN: 0018-9219, DOI: 10.1109/JPROC.2003.819611.

FR Search Report, dated Jul. 13, 2017, from corresponding FR 1660734 application.

* cited by examiner

METHOD AND SYSTEM FOR USER AUTHENTICATION BY VOICE BIOMETRICS

BACKGROUND OF THE INVENTION

Field of the Invention

The present invention relates to a method and system for user authentication by voice biometrics.

Description of the Related Art

The recognition of a speaker using a voice biometrics method is a method that is beginning to be used in different applications.

In general, this type of method may for example be applicable in access control systems, for instance to premises, or for other purposes, such as access to banking, administrative, etc. services.

One can then see that these authentication methods and systems must be as reliable as possible to thwart any problems, such as shams, or attacks in general.

It is in fact known that these shams or attacks may be of different natures, for example replay, voice transformation or voice synthesis.

Replay is a form of identity theft in which an imposter attacks a verification system of the speaker, by replaying a sequence of words by the target speaker that he has prerecorded.

There are for example two types of replay, namely nontechnical replay or microphone replay, or technical replay, also called transmission or processing replay.

Nontechnical replay or microphone replay is a replay that does not require any special technical knowledge.

It takes place at the microphone of the system.

This attack consists of replaying, in front of the microphone, an audio file of the target speaker that has been prerecorded, with a device such as a smartphone or recorder, computer, etc.

Technical replay, or transmission or processing replay, requires special technical skills.

It takes place at the transmission or processing of the audio signal.

In this type of attack, it is assumed that the imposter has been able to access the transmission or processing channel in general, audio or speech files, for example by piracy, and that he directly injects the prerecorded audio file of the target speaker into the system.

The difference between these two types of replay is that in nontechnical replay, the impulse response of the speakers of the replay device, as well as the room where the attack is carried out, is added to the audio signal prerecorded by the imposter.

SUMMARY OF THE INVENTION

The aim of the invention is to propose improvements to this type of authentication method and system, to further improve their reliability and resistance to attacks.

To that end, the invention relates to a method for user authentication by voice biometrics, characterized in that it includes a prior phase for referencing an authorized user, during which this user pronounces a reference phrase at least once, and this phrase is converted into a series of reference symbols by a statistical conversion mutual to all of the users to be referenced, and an authentication test phase, including a first step during which a candidate user pronounces the reference phrase at least once, and this pronounced phrase is converted in the same manner as the reference phrase during the prior phase, by using the same conversion, into a sequence of candidate symbols, and a second step during which the series of candidate symbols is compared to the series of reference symbols to determine a comparison result and this result is compared to at least one predetermined threshold, to decide whether the candidate user who pronounced the phrase during the test phase is indeed the authorized user, and therefore to authenticate him.

According to other features of the method according to the invention, considered alone or in combination:
- the statistical conversion is a conversion for which the learning is done in an unsupervised manner;
- the statistical conversion uses hidden Markov models;
- the comparison result is a distance calculated between two series of symbols;
- the calculated distance is the Levenshtein distance;
- the comparison result is compared to predetermined thresholds, to detect replays;
- the comparison result is compared to two predetermined thresholds, to detect replays by a reproduction of a recording of the authorized user captured without his consciousness, when the user pronounces the reference phrase or during the transmission are processing thereof;
- the user is asked to repeat the reference phrase at least twice in a row and the result of the comparison of the corresponding successive series of symbols is compared to at least one predetermined threshold to detect audio environment problems.

According to another aspect, the invention also relates to a system for user authentication by voice biometrics, for carrying out a method as previously described, characterized in that it includes means for prior referencing of an authorized user, in which this user pronounces a reference phrase at least once, and this phrase is converted into a series of reference symbols by a statistical conversion mutual to all of the users to be referenced, and authentication test means, including first means in which a candidate user pronounces the reference phrase at least once, and this pronounced phrase is converted in the same manner as the reference phrase during the prior phase, by using the same conversion, into a sequence of candidate symbols, and second means in which the series of candidate symbols is compared to the series of reference symbols to determine a comparison result and this result is compared to at least one predetermined threshold, to decide whether the candidate user who pronounced the phrase during the test phase is indeed the authorized user, and therefore to authenticate him.

BRIEF DESCRIPTION OF THE DRAWINGS

The invention will be better understood upon reading the following description, provided solely as an example, and done in reference to the appended drawings, in which.

DESCRIPTION OF THE PREFERRED EMBODIMENTS

Figure 1:
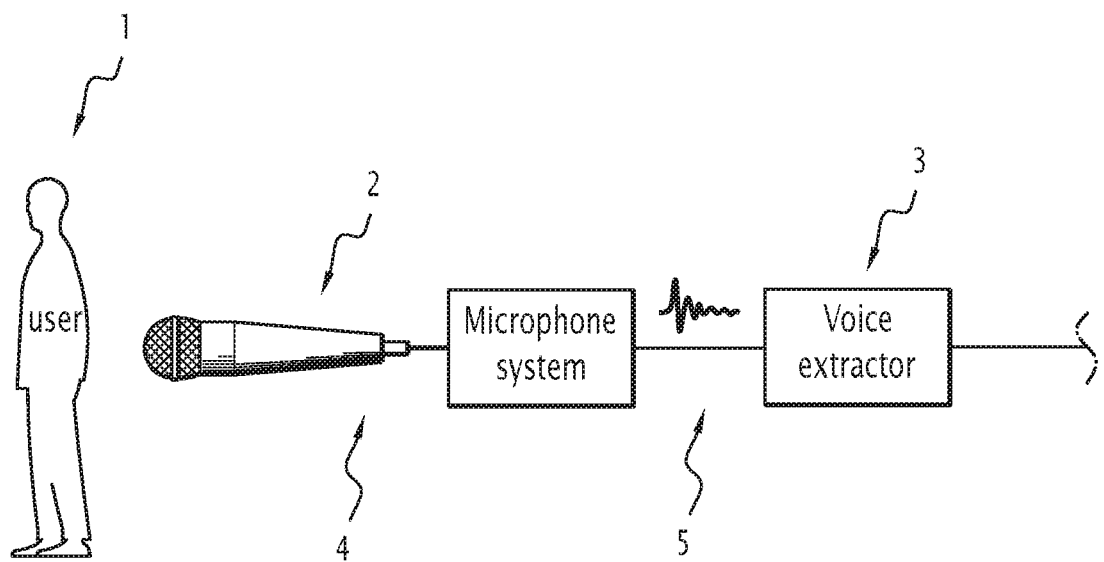
FIG. 1 is a block diagram illustrating part of an authentication system illustrating the nontechnical and technical replay zones.

These figures, and in particular FIG. 1, in fact illustrate part of a system for user authentication by voice biometrics.

In this FIG. 1, the user of the authentication system is designated by general reference 1.

This user has a microphone system, designated by general reference 2, connected to means for extracting voice characteristics, designated by general reference 3.

The rest of the processing chain is not illustrated, inasmuch as this FIG. 1 is provided only to define what, in the present application, constitutes a non-technical replay and a technical replay and where the corresponding attacks can be carried out.

In fact and as previously described, a nontechnical replay or microphone replay is a replay that does not require any special technical knowledge, and it takes place at the microphone system 2.

This replay consists of an attack during which an audio file of the target speaker that has been prerecorded is replayed in front of the microphone, with a device such as a smartphone, tablet, etc.

Nontechnical replay is therefore replay that takes place at the zone designated by general reference 4 in this FIG. 1.

Technical replay or transmission or processing replay is in turn replay that requires technical skills and is carried out at the transmission or processing of the signal, i.e., from the zone designated by general reference 5 in this FIG. 1.

In this attack, it is assumed that the imposter has been able to access the transmission or processing channel of the audio files, for example by piracy, and that he directly injects the prerecorded audio file of the target speaker into the transmission or processing chain.

As also previously indicated, the invention proposes to improve the methods and systems of this type, to improve their resistance to this type of attack.

Figure 2:
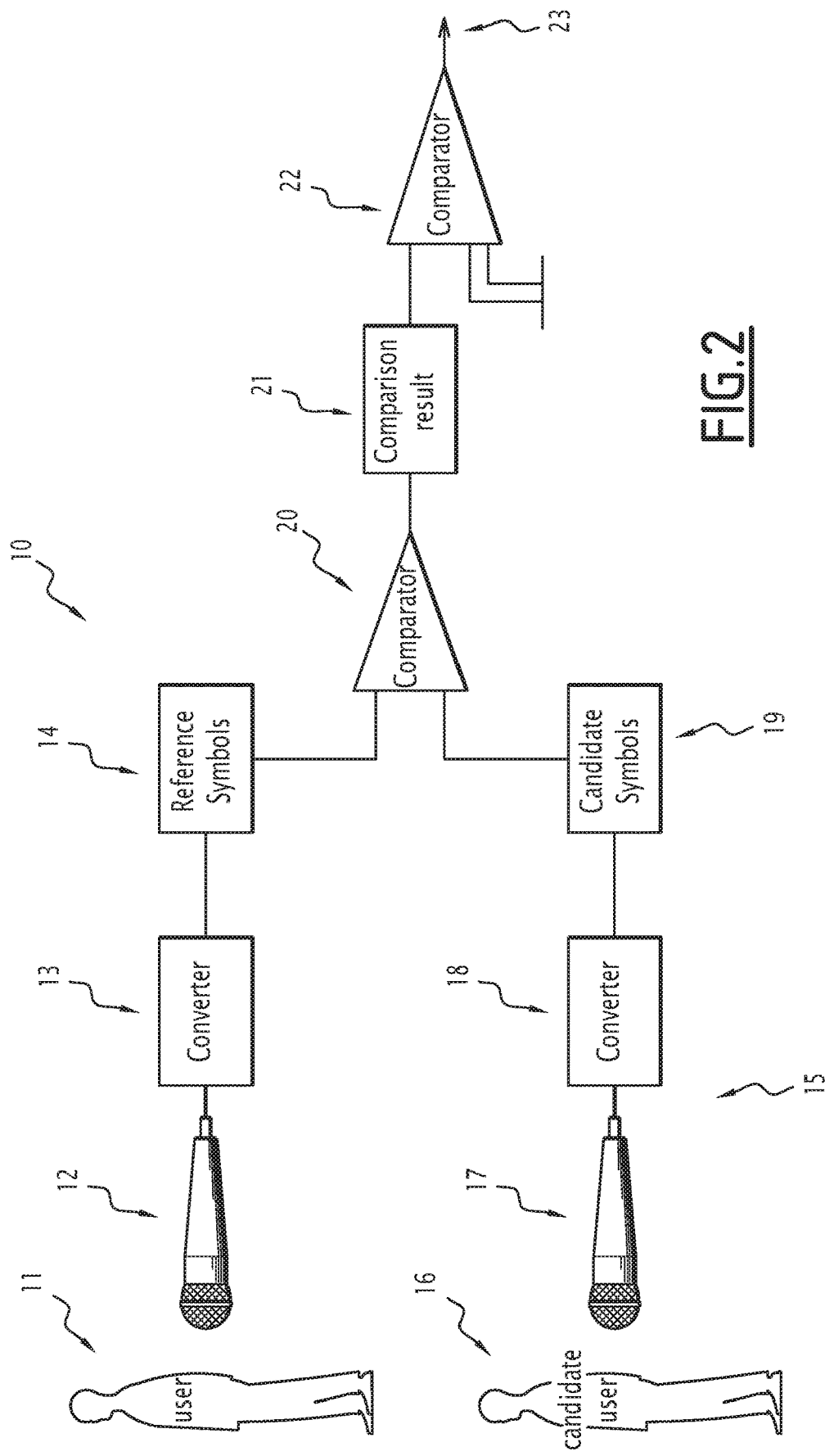
FIG. 2 illustrates a block diagram of one example embodiment of an authentication method according to the invention.

FIG. 2 shows a method for user authentication by voice biometrics, according to the invention.

This method includes a prior phase for referencing an authorized user.

This phase is designated by general reference 10 in this figure.

During this phase, a user, designated by general reference 11 in this figure, pronounces a reference phrase at least once.

This is for example done through a microphone system, designated by general reference 12.

This reference phrase, pronounced during this prior referencing phase of the user, is next converted into a series of reference symbols, through a statistical conversion mutual to all of the users to be referenced in the system.

This statistical conversion can for example be a conversion for which the learning is done in an unsupervised manner.

As an example, this statistical conversion uses hidden Markov models.

This conversion operation is also called MMC Method and is designated by general reference 13 in this FIG. 2.

This conversion makes it possible to obtain a series of characters for example designated by general reference 14 in this figure.

All of the users to be referenced then go through this prior referencing phase, to form a database of authorized users in the system.

The method according to the invention also includes an authentication test phase.

This authentication test phase is designated by general reference 15 in this FIG. 2.

During this authentication test phase, a candidate user, designated by general reference 16 in this figure, pronounces the reference phrase at least once.

This is for example done through microphone means, designated by general reference 17 in this figure.

This phrase pronounced during this authentication test phase 15 is also converted in the same manner as the reference phrase pronounced during the prior referencing phase 10, using the same conversion, into a series of symbols that is then a series of candidate symbols.

In this FIG. 2, the conversion is designated by general reference 18 and also for example implements the hidden Markov models.

The series of candidate symbols obtained after conversion is designated by general reference 19.

The series of candidate symbols 19 obtained after conversion of the phrase pronounced by the candidate user during this authentication phase is next compared to the series of reference symbols 14.

This comparison is for example designated by general reference 20 in this FIG. 2.

One then obtains a comparison result between the series, designated by general reference 21 in this FIG. 2.

This comparison result 21 is next compared to at least one predetermined threshold, to decide whether the candidate user who pronounced the phrase during the test phase 15 is indeed an authorized user, and therefore to authenticate him.

This comparison of the comparison result with at least one predetermined threshold is designated by general reference 22 in this FIG. 2, and the decision is obtained in 23.

As an example, the result 21 of the comparison done in 20 can be a degree of similarity or a distance, calculated between the two series of symbols.

This distance can in particular be the Levenshtein distance.

In general, the comparison result 21 can then be compared to predetermined thresholds to detect replays, as they were previously described.

Indeed, the comparison result 21 can be compared to predetermined thresholds, for example two, to detect replays by a reproduction of a recording of the authorized user, captured without his consciousness, when the user pronounces the reference phrase or during the transmission are processing thereof, in the rest of the system.

These are the attacks by non-technical and technical replay previously described.

As previously indicated, during the prior referencing phase 10 and the authentication test phase 15, the user may be asked to pronounce a test phrase at least once.

In particular, the user may be asked to repeat the reference phrase at least twice in a row.

This then for example also makes it possible to compare the corresponding successive series of symbols and to compare the result of this comparison to at least one predetermined threshold to detect audio environment problems, in particular when it is noisy.

Of course, other embodiments of this method and this system can be considered.

The verification of the speaker then consists of determining whether a speaker is indeed who he claims to be.

The method and the system according to the invention have, as input, a speech sample and a stated identity of a user with a reference.

A similarity or distance measurement is calculated between the sample and the reference of the speaker corresponding to the programmed identity.

During this measurement, the system accepts or rejects the speaker.

In the verification of the speaker depending on the text, the text pronounced by the speaker to be recognized by the system is the same as that which he pronounced to create his reference.

Consequently, the challenge of a speaker verification system depending on the text is to model both the characteristics of the speaker and the lexical content of the pronounced phrase.

Therefore, a speaker verification system depending on the text should be able to reject a speaker having pronounced a phrase different from his reference phrase.

In the method and the system according to the invention, audio data segmentation methods are applied with statistical models learned in an unsupervised manner for text-dependent speaker verification.

With these methods, the audio data is converted into a chain of symbols. Thus, reference and test audio data can be compared, and a degree of similarity or a distance between them can be measured.

To measure the distance or the similarity between two audio files converted into sequences of symbols, the Levenshtein distance is preferably used.

By establishing a threshold, it is thus possible to accept or reject the speaker and to detect that the pronounced phrase is indeed the reference phrase.

Of course, other embodiments may also be considered.

The invention claimed is:

1. A method for user authentication by voice biometrics comprising:
    a prior phase for referencing an authorized user, during which the user pronounces a reference phrase at least once, and the phrase is converted into a series of reference symbols by a statistical conversion mutual to all of the users to be referenced,
    wherein the series of reference symbols forms a first string; and
    an authentication test phase comprising:
        a first step during which a candidate user pronounces the reference phrase at least once, and this pronounced phrase is converted in the same manner as the reference phrase during the prior phase, by using the same conversion, into a series of candidate symbols,
        wherein the series of candidate symbols forms a second string, and
        a second step during which the series of candidate symbols is compared to the series of reference symbols to determine a comparison result and this result; and
    determining whether the candidate user who pronounced the phrase during the test phase is indeed the authorized user, and therefore to authenticate him,
    wherein the comparison result is a distance calculated between two series of symbols and the calculated distance is the Levenshtein distance,
    wherein the method is implemented by a processing chain and a microphone system,
    wherein the conversion of the reference phrase into reference symbols and the conversion of the pronounced phrase into candidate symbols are both according to a statistical model, implemented in the processing chain, that depends on both characteristics of the speaker and on lexical content of the pronounced phrase,
    wherein the comparison result is compared to two predetermined thresholds to detect replays by a reproduction of a recording of the authorized user captured without his consciousness during the transmission or during the processing thereof.

2. The method for user authentication by voice biometrics according to claim 1, wherein the statistical conversion is a conversion for which the learning is done in an unsupervised manner.

3. The method for user authentication by voice biometrics according to claim 1, wherein the statistical conversion uses hidden Markov models.

4. The method for user authentication by voice biometrics according to claim 1, wherein the user is asked to repeat the reference phrase at least twice in a row and the result of the comparison of the corresponding successive series of symbols is compared to at least one predetermined threshold to detect audio environment problems.

5. A system for user authentication by voice biometrics, for carrying out a method according to claim 1, comprising:
    a first microphone,
    a processing chain comprising a first converter for prior referencing of an authorized user, in which the user pronounces into the first microphone a reference phrase at least once, and the phrase is converted by the first converter into a series of reference symbols by a statistical model mutual to all of the users to be referenced, wherein the series of reference symbols forms a first string,
    an authentication tester comprising the first microphone or a second microphone into which a candidate user pronounces the reference phrase at least once, and this pronounced phrase is converted by the first converter or by a second converter in the same manner as the reference phrase during the prior phase, by using the same statistical model, into a series of candidate symbols, wherein the series of candidate symbols forms a second string,
        wherein the conversion of the reference phrase into reference symbols and the conversion of the pronounced phrase into candidate symbols depend on both characteristics of the speaker and on lexical content of the pronounced phrase, and
    a comparator configured to compare the series of candidate symbols to the series of reference symbols to determine a comparison result,
        wherein the result is compared to two predetermined thresholds to detect replays by a reproduction of a recording of the authorized user captured without his consciousness during the transmission or during the processing thereof, to decide whether the candidate user who pronounced the phrase during the test phase is indeed the authorized user, and therefore to authenticate him, and
    wherein the comparison result is a distance calculated between two series of symbols and the calculated distance is the Levenshtein distance.

* * * * *